United States Patent
Adaniya et al.

(10) Patent No.: US 6,725,681 B2
(45) Date of Patent: Apr. 27, 2004

(54) AIR CONDITIONER

(75) Inventors: Taku Adaniya, Kariya (JP); Masahiro Kawaguchi, Kariya (JP); Shoichi Ieoka, Kariya (JP); Yasuharu Odachi, Kariya (JP); Kazuhiko Minami, Kariya (JP); Tomoharu Arai, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/304,624

(22) Filed: Nov. 26, 2002

(65) Prior Publication Data
US 2003/0097853 A1 May 29, 2003

(30) Foreign Application Priority Data
Nov. 27, 2001 (JP) .......................... 2001-360719

(51) Int. Cl.[7] .................................. F25B 1/00
(52) U.S. Cl. ................. 62/228.5; 62/133; 62/244; 417/45; 417/222.2; 417/223; 417/374
(58) Field of Search .................. 62/215, 228.5, 62/230, 244, 133, 228.3, 323.1; 417/45, 222.2, 212, 16, 374, 223

(56) References Cited

U.S. PATENT DOCUMENTS

| 3,754,626 | A | * | 8/1973 | Heidorn ........................ 192/38 |
| 4,487,029 | A | * | 12/1984 | Hidaka et al. ................. 62/133 |
| 4,932,843 | A | * | 6/1990 | Itoigawa et al. .......... 417/222.1 |
| 5,376,866 | A | * | 12/1994 | Erdman ........................ 318/254 |
| 5,385,029 | A | * | 1/1995 | Yamanaka et al. ............ 62/133 |
| 5,584,670 | A | * | 12/1996 | Kawaguchi et al. ...... 417/222.2 |
| 5,713,725 | A | * | 2/1998 | Kawaguchi et al. ...... 417/222.2 |
| 5,924,296 | A | | 7/1999 | Takano et al. ................. 62/133 |
| 6,230,507 | B1 | * | 5/2001 | Ban et al. .................. 62/228.4 |
| 6,247,899 | B1 | * | 6/2001 | Ban et al. ...................... 417/16 |
| 6,250,093 | B1 | * | 6/2001 | Fujii et al. .................. 62/228.3 |
| 6,290,468 | B1 | * | 9/2001 | Kato et al. ............... 417/222.2 |
| 6,336,335 | B2 | * | 1/2002 | Ota et al. ...................... 62/133 |
| 6,351,957 | B2 | * | 3/2002 | Hara ........................... 62/133 |
| 6,481,225 | B2 | * | 11/2002 | Kimura et al. ................. 62/133 |
| 6,481,227 | B1 | * | 11/2002 | Ota et al. ..................... 62/209 |
| 6,481,976 | B2 | * | 11/2002 | Kimura et al. ........... 417/222.2 |
| 2001/0003573 | A1 | * | 6/2001 | Kimura et al. |
| 2001/0013225 | A1 | * | 8/2001 | Ota et al. |

FOREIGN PATENT DOCUMENTS

| DE | 100 14 483 A1 | 11/2000 | ............ B60K/25/00 |
| EP | 1 127 721 A2 | 8/2001 | ............ B60H/1/32 |
| JP | 10-236151 | 9/1998 | ............ B60H/1/32 |
| JP | 2000-230482 | 8/2000 | ............ F04B/35/00 |
| WO | WO 00/23292 | 4/2000 | ............ B60H/1/32 |

* cited by examiner

*Primary Examiner*—William E. Tapolcai
*Assistant Examiner*—Mohammad M. Ali
(74) *Attorney, Agent, or Firm*—Morgan & Finnegan, LLP

(57) ABSTRACT

An air conditioner for air conditioning the interior of a compartment includes a compressor and an electric motor. The compressor compresses refrigerant gas and changes the displacement. The electric motor drives the compressor. A motor controller rotates the motor at a constant reference speed. A detection device detects information related to the thermal load on the air conditioner. A current sensor detects the value of current supplied to the electric motor. A controller controls the compressor based on the detected thermal load information and the detected current value. The controller computes a target torque of the compressor based on the thermal load information. In accordance with the computed target torque, the controller computes a target current value to be supplied to the electric motor. The controller further controls the displacement of the compressor such that the detected current value matches the target current value.

13 Claims, 2 Drawing Sheets

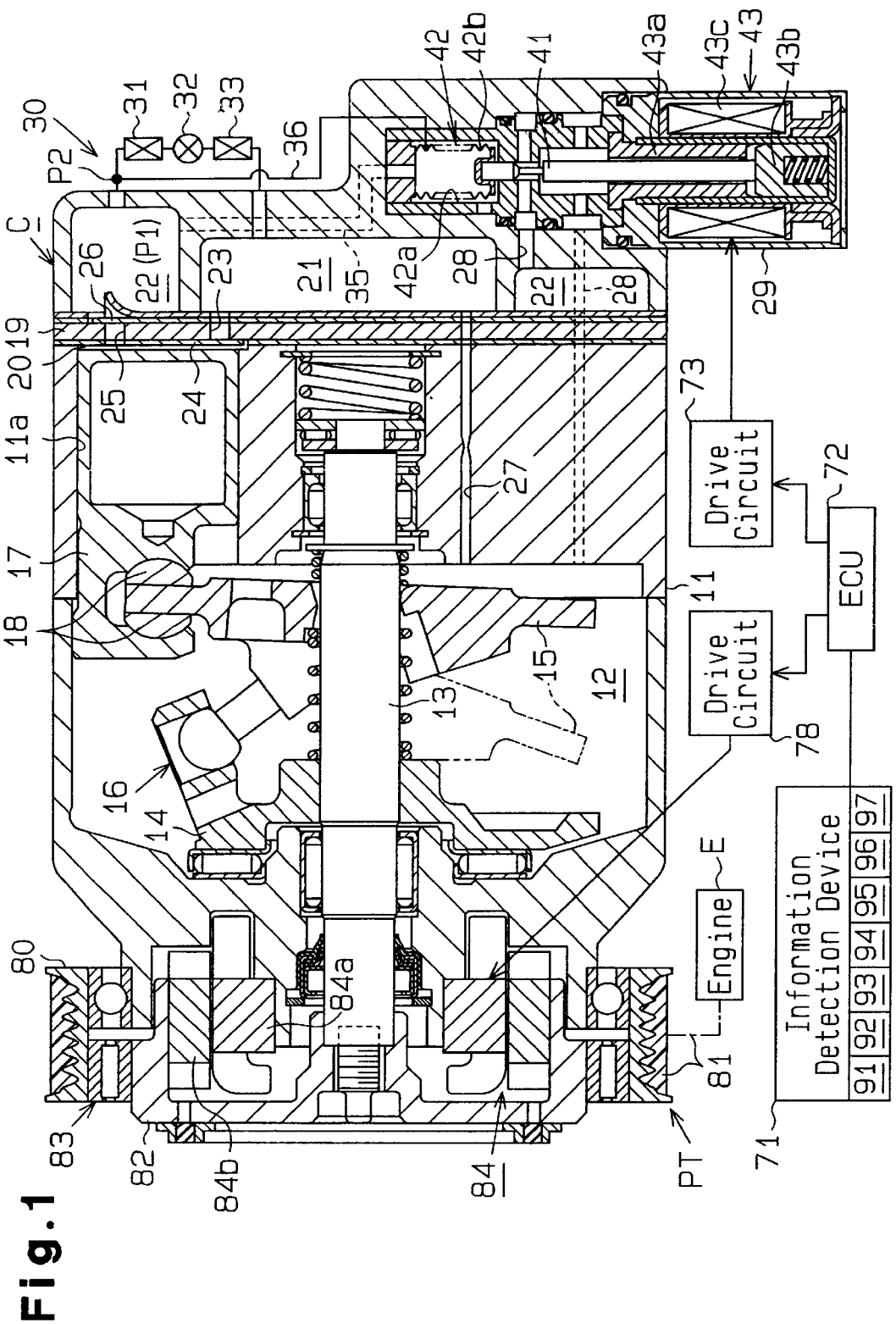

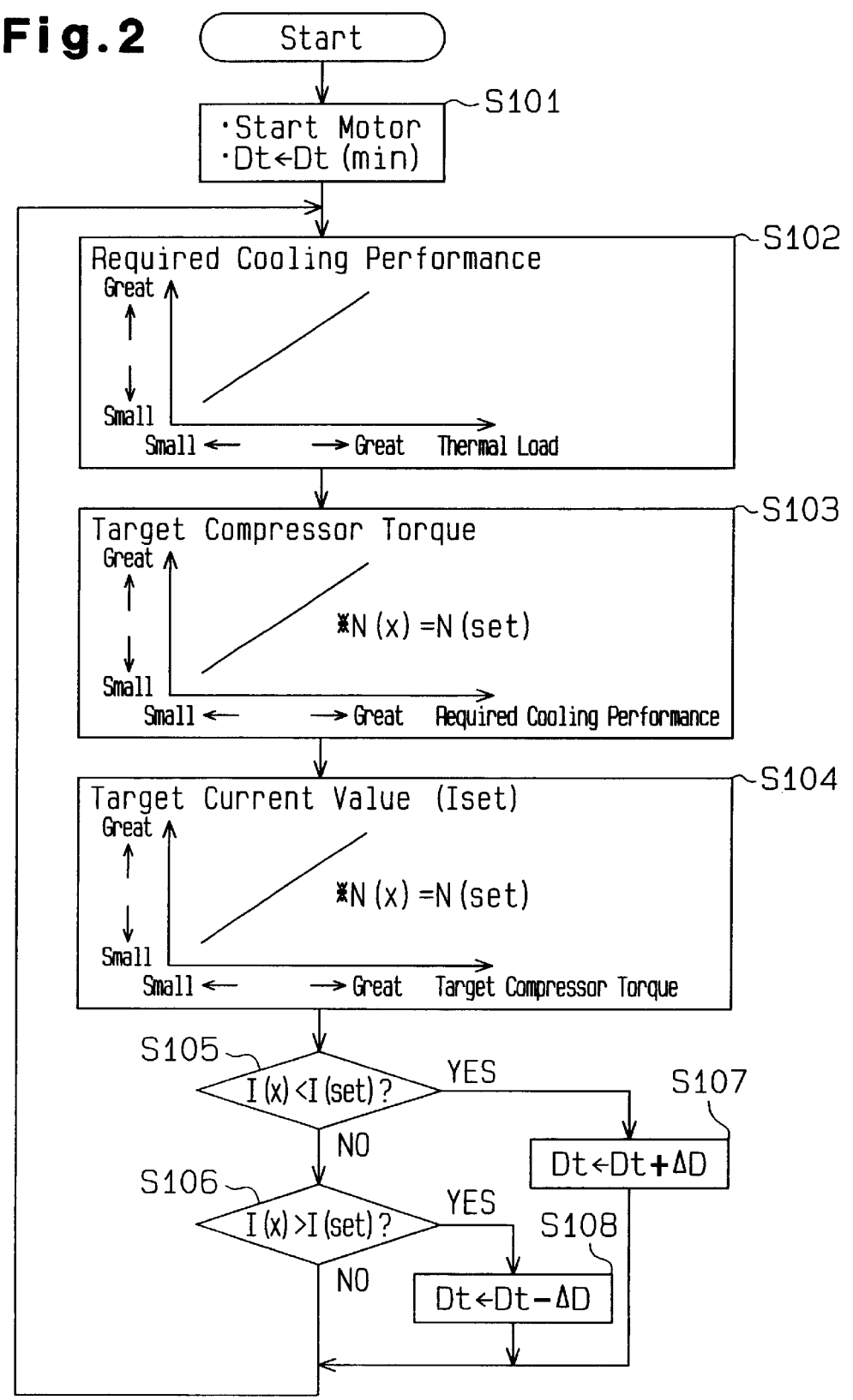

AIR CONDITIONER

BACKGROUND OF THE INVENTION

The present invention relates to an air conditioner that is mounted on a vehicle to air-condition the passenger compartment.

A typical on-vehicle air conditioner sets a target temperature of air that has passed through an evaporator based on thermal load information such as the outside temperature and tho temperature of the passenger compartment. The temperature of the air that has passed through the evaporator is detected by an evaporator temperature sensor, which includes, for example, a thermistor. Based on the target temperature and the temperature detected by the evaporator temperature sensor, the displacement of a variable displacement compressor is feedback controlled.

However, if the displacement of the compressor is feedback controlled by using the temperature of air immediately after it has passed through the evaporator as an index, there are the following drawbacks. That is, due to response delay of the thermistor to temperature changes and to uneven distribution of refrigerant in the evaporator, the temperature detected by the evaporator is different from the actual temperature. This is likely to cause hunting in the displacement control of the compressor and thus makes the air conditioning less comfortable.

SUMMARY OF THE INVENTION

Accordingly, it is an objective of the present invention to provide an air conditioner that suppresses hunting in the displacement control of a variable displacement compressor.

To achieve the foregoing and other objectives and in accordance with the purpose of the present invention, an air conditioner for air conditioning the interior of a compartment is provided. The air conditioner includes a variable displacement compressor, a motor controller, a detection device, a current sensor, and a controller. The compressor compresses refrigerant gas and changes the displacement. The electric motor drives the compressor. The motor controller rotates the motor at a constant reference speed. The detection device detects information related to the thermal load on the air conditioner. The current sensor detects the value of current supplied to the electric motor. The controller controls the compressor based on the detected thermal load information and the detected current value. The controller further: computes a target torque of the compressor based on the thermal load information; computes a target current value to be supplied to the electric motor in accordance with the computed target torque; and controls the displacement of the compressor such that the detected current value matches the target current value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a diagrammatic view showing an air-conditioner; and

FIG. 2 is a flowchart showing an air-conditioning control.

DETAILED DESCRIPTION OF THE PREFERRED EMBODIMENTS

One preferred embodiment according to the present invention will now be described. In this embodiment, the present invention is applied to an on-vehicle air-conditioner that air-conditions the passenger compartment of a vehicle.

As shown in FIG. 1, a variable displacement swash plate type compressor C (hereinafter referred to as compressor) includes a housing 11. A crank chamber 12 is defined in the housing 11. A drive shaft 13 is rotatably provided in the crank chamber 12 of the housing 11. The drive shaft 13 is coupled to the output shaft of a power source of the vehicle, which is an internal combustion engine E in this embodiment, through a rotary body device, which is a pulley device PT in this embodiment.

The pulley device PT includes a rotary body 80 rotatably supported by the housing 11. A belt 81 from the engine E is engaged with the circumference of the rotary body 80, A hub 82 is fixed to a portion of the drive shaft 13 that protrudes out of the housing 11. A conventional one-way clutch 83 is located between the rotary body 90 and the hub 82.

The pulley device PT includes an electric motor 84. The electric motor 84 in located radially inward of the rotary body 80. The motor 84 is a switched reluctance (SR) motor having no magnets. The motor 84 includes a stator 84a and a rotor 84b. The stator 84a is fixed to the housing 11. The rotor 84b is fixed to the hub 82 and surrounds the stator 84a.

When the engine E is not running, a drive circuit 78, which includes, for example, an inverter, supplies current to the stator 84a as necessary based on a command from a motor controller. In this embodiment, the motor controller is an ECU 72. The current to the stator 84a from the drive circuit 78 generates rotational force at the rotor 84b and rotates the drive shaft 13 through the hub 82. In this state, transmission of power from the hub 82 to the rotary body 80 is blocked by the one way clutch 83. The rotational force generated by the motor 84 is therefore not undesirably transmitted to the engine E.

The one-way clutch 83 permits power to be transmitted from the rotary body 80 to the hub 82. Therefore, when the engine E is running, the power of the engine E is transmitted to the drive shaft 14 through the rotary body 80 and the hub 82.

A lug plate 14 is coupled to the drive shaft 13 and is located in the crank chamber 12. The lug plate 14 rotates integrally with the drive shaft 13. A swash plate 15 is accommodated in the crank chamber 12. The swash plate 15 slides along and inclines with respect to the drive shaft. 13. A hinge mechanism 16 is arranged between the lug plate 14 and the swash plate 15. The hinge mechanism 16 permits the swash plate 15 to rotate integrally with the lug plate 14 and the drive shaft 13, and to incline with respect to the drive shaft 13.

The housing 11 has cylinder bores 11a (only one is shown). Each piston 17 reciprocates inside the corresponding cylinder bore 11a. Each piston 17 is coupled to the peripheral portion of the swash plate 15 by a pair of shoes 18. The shoes 18 convert rotation of the swash plate 15, which rotates with the drive shaft 13, to reciprocation of the pistons 17.

A valve plate assembly 19 is located adjacent to the cylinder bores 11a, or rearward of the cylinder bores 11a as viewed in FIG 1. A compression chamber 20 is defined at the rear section (right section as viewed in FIG. 1) of each cylinder bore 11a by the corresponding piston 17 and the valve plate assembly 19. A Suction chamber 21 and a discharge chamber 22 are defined in the rear section of the housing 11.

The valve plate assembly 19 has suction ports 23, suction valve flaps 24, discharge ports 25 and discharge valve flaps 26. Each set of the suction port 23, the suction valve flap 24, the discharge port 25 and the discharge value flap 26 corresponds to one of the cylinder bores 11a. As each piston 17 moves from the top dead center to the bottom dead center, refrigerant gas in the suction chamber 21 is drawn into the corresponding compression chamber 20 through the corresponding suction port 23 while flexing the suction valve flap 24 to an open position. Refrigerant gas drawn into the compression chamber 20 is compressed to a predetermined pressure as the piston 17 is moved from the bottom dead center to the top dead center. Then, the gas is discharged to the discharge chamber 22 through the corresponding discharge port 25 while flexing the discharge valve flap 26 to an open position.

As shown in FIG. 1, a bleed passage 27 and a supply passage 28 are formed in the housing 11. The bleed passage 27 connects the crank chamber 12 with the suction chamber 21. The supply passage 28 connects the crank chamber 12 with the discharge chamber 22. A control valve 29 is located in the housing 11 to regulate the supply passage 28.

The opening degree of the control valve 29 is adjusted to control the balance between the flow rate of highly pressurized gas supplied to the crank chamber 12 through the supply passage 28 and the flow rate of gas conducted out of the crank chamber 12 through the bleed passage 27. The pressure in the crank chamber 12 is thus adjusted. The difference between the pressure in the crank chamber 12 and the pressure in the compression chambers 20 with the pistons 17 in between is changed according to changes in the crank chamber pressure. This alters the inclination angle of the swash plate 15. As a result, the stroke of each piston 17, that is, the displacement of the compressor C, is controlled.

For example, when the opening degree of the control valve 29 is reduced and the pressure in the crank chamber 12 is decreased, accordingly, the inclination angle of the swash plate 15 is increased. This increases displacement of the compressor C. In FIG. 1, the maximum inclination angle of the swash plate 15 is represented a chain double-dashed line. When the opening degree of the control valve 29 is increased and the pressure in the crank chamber 12 is raised, accordingly, the inclination angle of the swash plate 15 is decreased. This decreases displacement of the compressor C. In FIG. 1, the minimum inclination angle of the swash plate 15 is represented by solid lines.

As shown in FIG. 1, the refrigerant circuit of the vehicular air-conditioner includes the compressor C and an external refrigerant circuit 30. The external refrigerant circuit 30 includes a condenser 31, an expansion valve 32, and an evaporator 33.

A first pressure monitoring point P1 is set in the discharge chamber 22 of the compressor C. A second pressure monitoring point P2 is set in the refrigerant passage at a part that is downstream of the first pressure monitoring point P1. Specifically, the second pressure monitoring point P2 is spaced from the first pressure monitoring point P1 toward the condenser 31 by a predetermined distance. The difference between the pressure at the first pressure monitoring point P1 and the pressure at the second pressure monitoring point P2 represents the flow rate of refrigerant in the refrigerant circuit. That is, as the flow rate of refrigerant is increased, the pressure difference $\Delta Pd$ between the monitoring points P1 and P2 is increased. By contract, an the flow rate is decreased, the pressure difference $\Delta Pd$ is decreased.

The first pressure monitoring point P1 is connected to the control valve 29 through a first pressure introduction passage 35. The second pressure monitoring point P2 is connected to the control valve 29 through a second pressure introduction passage 36.

As shown in FIG. 1, the control valve 29 includes a valve body 41, a pressure sensing mechanism 42, and an electromagnetic actuator 43. The valve body 41 adjusts the opening degree of the supply passage 28. The pressure sensing mechanism 42 is coupled to the upper side of the valve body 41. The actuator 43 is coupled to the lower side of the valve body 41. When moved downward, the valve body 41 increases the opening degree of the supply passage 28. When moved upward, the valve body 41 reduces the opening degree of the supply passage 28. The pressure sensing mechanism 42 has a bellows 42b accommodated in a pressure sensing chamber 42a. In the pressure sensing chamber 42a, the interior of the bellows 42b is exposed to the pressure at the first pressure monitoring point P1 through the first pressure introduction passage 35. In the pressure sensing chamber 42a, the exterior of the bellows 42b is exposed to the pressure at the second pressure monitoring point P2 through the second pressure introduction passage 36.

The electromagnetic actuator 43 includes a stationary core 43a, a movable core 43b, and a coil 43c. The movable core 43b is coupled to the valve body 41. Based on information from an information detection device 71, the ECU 72 sends a command to a drive circuit 73. The drive circuit 73, in turn, supplies current that corresponds to the information to the coil 43c. Upward electromagnetic force (electromagnetic attractive force) is generated between the stationary core 43a and the movable core 43b. The magnitude of the upward force corresponds to the amount of the current supplied to the coil 43c from the drive circuit 73. The upward force is transmitted to the valve body 41 through the movable core 43b. The current to the coil 43c is varied by controlling the applied voltage. The applied voltage is controlled by pulse-width modulation (PWM).

In the control valve 29, when a current of a duty ratio that is greater than the minimum duty ratio Dt(min) (Dt(min) >0%) is supplied to the coil 43c, the upward electromagnetic force applied to the valve body 41 by the movable core 43b acts against the sum of the downward force applied to the valve body 41 by the bellows 42b based on the pressure difference $\Delta Pd$ and the downward force based on the elasticity of the bellows 42b. The position of the valve body 41 is determined such that these upward and downward forces are balanced.

For example, if the flow rate of the refrigerant in the refrigerant circuit is decreased due to a decrease in the speed of the engine E, the downward force applied to the valve body 41 by the bellows 42b based on the pressure difference $\Delta Pd$ decreases. Therefore, the valve body 41 moves upward to decrease the opening degree of the supply passage 28, which lowers the pressure in the crank chamber 12. Accordingly, the inclination angle of the swash plate 15 is increased, and the displacement of the compressor C is increased. The increase in the displacement of the compressor C increases the flow rate of refrigerant in the refrigerant circuit, which increases the pressure difference $\Delta Pd$.

By contrast, if the flow rate of the refrigerant in the refrigerant circuit is increased due to an increase in the speed of the engine E, the downward force applied to the valve body 41 by the bellows 42b based on the pressure difference $\Delta Pd$ increases. Therefore, the valve body 41 moves downward to increase the opening degree of the supply passage 28, which raises the pressure in the crank chamber 12. Accordingly, the inclination angle of the swash plate 15 is decreased, and the displacement of the compressor C is decreased. The decrease in the displacement of the compressor C decreases the flow rate of refrigerant in the refrigerant circuit, which decreases the pressure difference $\Delta Pd$.

When the duty ratio Dt of the current supplied to the coil 43c is increased to increase the upward electromagnetic force acting on the valve body 41, the valve body 41 moves upward and decreases the opening degree of the supply passage 28. As a result, the displacement of the compressor C is increased. Thus, the flow rate of refrigerant in the refrigerant circuit increases, which increases the pressure difference ΔPd.

By contrast, when the duty ratio Dt of the current supplied to the coil 43c is decreased to decrease the upward electromagnetic force acting on the valve body 41, the valve body 41 moves downward and increases the opening degree of the supply passage 28. As a result, the displacement of the compressor C is decreased. Thus, the flow rate of refrigerant in the refrigerant circuit decreases, which decreases the pressure difference ΔPd.

As described above, the pressure sensing mechanism 42 of the control valve 29 automatically determines the position of the valve body 41 in accordance with changes in the pressure difference ΔPd so that a target value of the pressure difference ΔPd, or an intended pressure difference, determined by the duty ratio Dt of the current to the coil 43c is maintained. The intended pressure difference is externally controlled by adjusting the duty ratio Dt of the current supplied to the coil 43c.

As shown in FIG. 1, the external information detection device 71 includes an air conditioner switch 91, a temperature adjuster 92 for setting a desired temperature in the passenger compartment, an in-car temperature sensor 93 for detecting the temperature in the passenger compartment, an outside temperature sensor 94 for detecting the outside temperature, an evaporator sensor 95 for detecting the temperature of air immediately after passing through the evaporator 33, a rotational speed sensor 96 for detecting the speed N(x) of the motor 84, and a current sensor 97 for detecting the current value I(x) supplied to the stator 84a of the motor 84. The evaporator sensor 95 is a thermistor. The temperature adjuster 92, the in-car temperature sensor 93, and the outside temperature sensor 94 form thermal load information detection means.

If the air conditioner switch 91 is on when the engine E is running, the air conditioner ECU 72 computes a required cooling performance (for example, the necessary blowoff temperature (TAO)) based on detection information from the temperature adjuster 92, the in-car temperature sensor 93, and the outside temperature sensor 94. The air conditioner ECU 72 then computes a target air temperature based on the required cooling performance. The ECU 72 determines the duty ratio Dt of the current to the coil 43c of the control valve 29 based on the target air temperature and the detected air temperature detected by the evaporator sensor 95, and commands the drive circuit 73 to drive the coil 43c at the computed duty ratio Dt.

For example, if the detected temperature from the evaporator sensor 95 is higher than the target air temperature, the ECU 72 commands the drive circuit 73 to increase the duty ratio Dt. Accordingly, the opening degree of the control valve 29 is decreased, and the displacement of the compressor C is increased. The air temperature is thus lowered. By contrast, if the detected temperature is lower than the target air temperature, the ECU 72 commands the drive circuit 73 to decrease the duty ratio Dt. Accordingly, the opening degree of the control valve 29 is increased, and the displacement of the compressor C is decreased. The air temperature is thus raised.

On the other hand, if the air conditioner switch 91 is on when the engine E is not running, the air conditioner ECU 72 commands the drive circuit 78 to actuate the motor 84 in step (hereinafter referred to as S) 101 in the flowchart of FIG. 2. Also, the ECU 72 actuates the control valve 29 while lowering the duty ratio Dt to the drive circuit 73 to the minimum duty ratio Dt(min) in the range of the duty ratio Dt. The motor 84 rotates at a constant reference speed N(set). The drive circuit 78 is feedback controlled based on the rotation speed information N(x) from the rotation speed sensor 96 so that the reference speed N(set) is maintained.

In S102, the ECU 72 computes the required cooling performance based on the thermal load information from the temperature adjuster 92, the in-car temperature sensor 93, and the outside temperature sensor 94. For a greater thermal load, the required cooling performance is set greater. For a smaller thermal load, the required cooling performance is set smaller.

In S103, the ECU 72 computes a target torque for realizing the computed required cooling performance on the assumption that the speed of the drive shaft 13 of the compressor C, or the speed N(x) of the motor 84, is equal to the predetermined constant reference speed N (set). For a greater required cooling performance, the target torque is set greater. For a smaller required cooing performance, the target torgue is set smaller. The computation of the target compressor torque is performed such that the target compressor torque does not exceed the maximum torque of the motor 84.

The relationship among the speed, the output torque, and the input current value of the motor 84 is determined by the characteristics of the motor 84. Based on this relationship, the ECU 72 computes, In step S104, the target current value I(set). The target current value I(set) is the current value I(x) supplied to the motor 84 to cause the motor 84 to output the target torgue, which is computed in S103, at the reference speed N(set). For a greater target torque, the target current value I(set) is set greater. For a smaller target compressor torque, the target current value I(set) is set smaller.

In S105, the ECU 72 determines whether the detected current value I(x) from the current sensor 97 is less than the target current value I(set). In S106, the ECU 72 determines whether the detected current value I(x) is greater than the target current value I(set). If the outcomes of S105 and S106 are negative, the motor 24 is receiving the target current I(set) and the compressor torque is equal to the target torgue. That is, the displacement of the compressor C, or the required cooling performance of the air conditioner, is adequately controlled. Therefore, a change or the duty ratio Dt, which would results in a change in the cooing performance of the air conditioner, is not made. The ECU 72 then proceeds to S102.

If the outcome of S105 is positive, the compressor torque is less than the target torque It is therefore judged that the displacement of the compressor C, or the cooling performance of the air conditioner is insufficient. Therefore, in S107, the ECU 72 increases the duty ratio Dt by a unit ΔD, and commando the drive circuit 73 to change the duty ratio Dt to the adjusted value (Dt+ΔD). Accordingly, the opening degree of the control valve 29 is slightly decreased, and the displacement of the compressor C is slightly increased. The compressor torque is therefore slightly increased. This slightly increased the current value I(x) supplied from the drive circuit 78 to the motor 84.

If the outcome of S106 is positive, the compressor torgue is greater than the target torque. It is therefore judged that the displacement of the compressor C, or the cooling performance of the air conditioner is excessive. Therefore, in S108, the ECU 72 decreases the duty ratio Dt by the unit ΔD, and commands the drive circuit 73 to change the duty ratio Dt to the adjusted value (Dt ΔD). Accordingly, the opening degree of the control valve 29 is slightly increased, and the displacement of the compressor C is slightly decreased. The compressor torque is therefore slightly decreased. This slightly decreases the current value I(x) supplied from the drive circuit 78 to the motor 84.

In this manner, the duty ratio Dt is adjusted in S107 and/or S108. Thus, even if the compressor torque is deviated from the target compressor torque, in other words, even if the cooling performance of the air conditioner is deviated from the required cooling performance, the intended pressure difference or the control valve 29 is gradually optimized. Further, the control valve 29 automatically adjusts its opening degree. Therefore, the cooling performance of the air conditioner is quickly converged on the required cooling performance.

This embodiment provides the following advantages.

(1) when the compressor C is driven by thy motor 84, the displacement of the compressor C is feedback controlled by using the compressor torque as an index. Changes in the displacement of the compressor C are in close cooperation with changes of the compressor torgue. That is, the compressor torque rapidly responds to a change in the displacement of the compressor C. Therefore, hunting in the control of the compressor displacement, which would be observed if the feedback control is performed by using the air temperature as an index, is effectively suppressed. Air conditioning is thus made comfortable for the passengers.

To maintain the compressor torque at the target compressor torque, feedback control is performed by directly detecting the current value I(x) supplied to the motor 84. Therefore, no costly torque sensor for directly detecting the compressor torque is needed.

(2) A hybrid compressor is used as the compressor C. Thus, if the motor 84 were designed to have the same compressor driving performance as the engine E, the size of the motor 84 would be increased and the motor 84 would not fit in the engine compartment. Accordingly, a small motor must be used as the motor 84. However, if a small motor is used as the motor 84, an excessive compressor torque pulls the motor 84 out of synchronism and consequently stops the motor 84. This adversely affects the air conditioning. Under such circumstances, effective suppression to hunting in control of the compressor displacement to prevent an excessive increase in the compressor torque is effective to permit the motor 84 to operate in a stable manner while improving the comfort of the air conditioning.

(3) The motor 84 is incorporated in the pulley device PT of the compressor C. In other words, the motor 84 is small and produces small power. Therefore effective suppression of hunting in control of the compressor displacement is effective to permit the rotor 94 to operate in a stable manner while improving the comfort of the air conditioning.

(4) Unlike a control valve that changes a target suction pressure, the control valve 29 does not use the suction pressure, which is affected by the magnitude of the thermal load at the evaporator 33, as an index. Instead, the control valve 29 directly controls the pressure difference ΔPd between the two pressure monitoring points P1 and P2, each of which reflects the pressure in the refrigerant circuit, thereby feedback controlling the compressor displacement. Thus, without being influenced by the thermal load on the evaporator 33, the compressor displacement is quickly and reliably controlled through the external control performed by the ECU 72. Therefore, the control valve 29 effectively suppresses hunting in control of the compressor displacement and has an effective configuration to permit the motor 84 to operate in a stable manner while improving the comfort of the air conditioning.

It should be apparent to the skilled in the art that the present invention may be embodied in many other specific forms without departing from the spirit or scope of the invention. Particularly, it should be understood that the invention may be embodied in the following forms.

The first pressure monitoring point P1 and the second pressure monitoring point P2 may be set in a suction pressure zone, which includes the evaporator 33 and the suction chamber 21. In this case, the second pressure monitoring point P2 is located downstream of the first pressure monitoring point P1.

A control valve that is capable of changing a target suction pressure may be used as the control valve 29.

The control valve 29 may be located on the bleed passage 27. In this case, the control valve 29 does not adjust the opening degree of the supply passage 20 but adjusts the opening degree of the bleed passage 27 to adjust the pressure in the crank chamber 12.

A wobble type compressor may be used as the variable displacement compressor.

Other than the SR motor, a high-efficiency compact brushless motor with magnet or a high efficiency direct-current motor with brushes may be used as the electric motor. Alternatively, different types of motor may be used as the electric motor depending on the type of the supply circuit for the motor. Specifically, if the supply circuit of the electric motor is a low-voltage type, a direct-current motor is used, and if the supply circuit is a high-voltage type, a brushless motor with magnet or an SR motor is used.

The present invention may be applied to the air conditioner of a vehicle in which a variable displacement compressor is driven only by an electric motor. For example, the present invention may be applied to an electric vehicle.

In the illustrated embodiment, the present invention is applied to the air conditioner that air-conditions the passenger compartment. However, the present invention may be applied to a vehicle air conditioner for air conditioning (controlling the temperature of) the cargo compartment of, for example a freezer car or refrigerator car. The application of the present invention is not limited to vehicles. However, the present invention may applied to air conditioners that air conditions the interior of buildings such as a home air conditioner.

Therefore, the present examples and embodiments are to be considered as illustrative and not restrictive and the invention is not to be limited to the details given herein, but may be modified within the scope and equivalence of the appended claims.

What is claimed is:

1. An air conditioner for air conditioning the interior of a compartment, wherein the air conditioner is mounted on a vehicle to air condition the passenger compartment of the vehicle and is also driven by an engine of the vehicle, the air conditioner comprising:

a variable displacement compressor, wherein the compressor compresses refrigerant gas and changes the displacement, wherein the compressor includes a housing, wherein the housing rotatably supports a rotary body, the rotary body being rotated by the engine, an electric motor for driving the compressor, wherein the electric motor is located radially inward of the rotary body;

a motor controller for rotating the motor at a constant reference speed;

a detection device for detecting information related to the thermal load on the air conditioner;

a current sensor for detecting the value of current supplied to the electric motor; and a controller for controlling the compressor based on the detected thermal load information and the detected current value, wherein the controller:

computes a target torque of the compressor based on the thermal load information;

computes a target current value to be supplied to the electric motor in accordance with the computed target torque; and controls the displacement of the compressor such that the detected current value matches the target current value matches the target value.

2. The air conditioner according to claim 1, further comprising a control valve for changing the displacement of the compressor.

3. The air conditioner according to claim 2, wherein the compressor has a suction chamber, a discharge chamber, a crank chamber, and a supply passage, the supply passage connecting the discharge chamber with the crank chamber, wherein the control valve is located in the supply passage to adjust the opening degree of the supply passage.

4. The air conditioner according to claim 3, further comprising a refrigerant circuit including the compressor and an external refrigerant circuit, wherein the control valve includes a pressure sensing mechanism, and wherein the pressure sensing mechanism detects the pressure difference between two pressure monitoring points set along the refrigerant circuit.

5. The air conditioner according to claim 4, wherein the external refrigerant circuit includes a condenser, an expansion valve, and an evaporator.

6. The air conditioner according to claim 4, wherein the control valve includes:
  a valve body for adjusting the opening degree of the supply passage; and
  an actuator, wherein the actuator changes force applied to the valve body based on a command from the controller, thereby changing an intended pressure, the intended pressure being used as a reference when the pressure sensing mechanism determines the position of the valve body.

7. An air conditioner for air conditioning the passenger compartment of a vehicle having an engine, comprising:
  a variable displacement compressor driven by the engine, wherein the compressor compresses refrigerant gas and changes the displacement, the compressor including a housing, the housing accommodating a rotary body, the rotary body being rotated by the engine;
  an electric motor for driving the compressor when the engine is not running, the electric motor being located radially inward of the rotary body;
  a one-way clutch for selectively transmitting the power from the engine and the electric motor to the compressor, wherein, when the engine is running, the one-way clutch transmits the power of the engine to the compressor, and
  wherein, when the engine is not running, the one-way clutch transmits the power of the electric motor to the compressor;
  a motor controller for rotating the motor at a constant reference speed;
  a detection device for detecting information related to the thermal load on the air conditioner;
  a current sensor for detecting the value of current supplied to the electric motor;
  a controller for controlling the compressor based on the detected thermal load information and the detected current value, wherein the controller:
  computes a target torque of the compressor based on the thermal load information;
  computes a target current value to be supplied to the electric motor in accordance with the computed target torque; and
  controls the displacement of the compressor such that the detected current value matches the target current value.

8. The air conditioner according to claim 7, further comprising a control valve for changing the displacement of the compressor.

9. The air conditioner according to claim 7, wherein the compressor has a suction chamber, a discharge chamber, a crank chamber, and a supply passage, the supply passage connecting the discharge chamber with the crank chamber, wherein the control valve is located in the supply passage to adjust the opening degree of the supply passage.

10. The air conditioner according to claim 9, further comprising a refrigerant circuit including the compressor and an external refrigerant circuit, wherein the control valve includes a pressure sensing mechanism, and wherein the pressure sensing mechanism detects the pressure difference between two pressure monitoring points set along the refrigerant circuit.

11. The air conditioner according to claim 10, wherein the external refrigerant circuit includes a condenser, an expansion valve, and an evaporator.

12. The air conditioner according to claim 10, wherein the control valve includes:
  a valve body for adjusting the opening degree of the supply passage; and
  an actuator, wherein the actuator changes force applied to the valve body based on a command from the controller, thereby changing an intended pressure, the intended pressure being used as a reference when the pressure sensing mechanism determines the position of the valve body.

13. A method for controlling an air conditioner that air conditions the interior of a compartment, wherein the air conditioner is mounted on a vehicle to air condition the passenger compartment of the vehicle and is driven by an engine of the vehicle, wherein the compressor includes a housing, wherein the housing rotatably supports a rotary body, the rotary body being rotated by the engine, the air conditioner including a variable displacement compressor and an electric motor located radially inward of the rotary body, wherein the compressor compresses refrigerant gas and changes the displacement, and wherein the electric motor also drives the compressor, the method comprising:
  computing required cooling performance based on information related to the thermal load on the air conditioner;
  computing a target torque of the compressor based on the computed cooling performance;
  computing a target current value to be supplied to the electric motor in accordance with the computed target torque; and
  controlling the displacement of the compressor such that a current value detected by a current sensor matches the target current value.

* * * * *

UNITED STATES PATENT AND TRADEMARK OFFICE
CERTIFICATE OF CORRECTION

PATENT NO. : 6,725,681 B1
DATED : April 27, 2004
INVENTOR(S) : Taku Adaniya et al.

It is certified that error appears in the above-identified patent and that said Letters Patent is hereby corrected as shown below:

Column 6,
Line 57, please delete "(Dt ΔD)" and insert therefore -- (Dt - ΔD) --

Signed and Sealed this

Tenth Day of August, 2004

JON W. DUDAS
*Acting Director of the United States Patent and Trademark Office*